US006822785B1

(12) United States Patent
Chu et al.

(10) Patent No.: US 6,822,785 B1
(45) Date of Patent: Nov. 23, 2004

(54) MINIATURE, NARROW BAND, NON-COLLINEAR ACOUSTIC OPTICAL TUNABLE FILTER FOR TELECOM APPLICATIONS

(75) Inventors: Raymond R. Chu, Cupertino, CA (US); Qing Jiang, San Jose, CA (US)

(73) Assignee: Acceeze, Inc., Santa Clara, CA (US)

( * ) Notice: Subject to any disclaimer, the term of this patent is extended or adjusted under 35 U.S.C. 154(b) by 21 days.

(21) Appl. No.: 10/455,151

(22) Filed: Jun. 4, 2003

(51) Int. Cl.$^7$ .............................................. G02F 1/33
(52) U.S. Cl. ...................... 359/308; 359/312
(58) Field of Search ........................ 359/308, 312, 359/309, 310, 313, 314, 285

(56) References Cited

U.S. PATENT DOCUMENTS 4,653,869 A * 3/1987 Gottlieb et al. ............. 359/308
5,463,493 A * 10/1995 Shah .......................... 359/312

* cited by examiner

Primary Examiner—Scott J. Sugarman
Assistant Examiner—Richard Hanig
(74) Attorney, Agent, or Firm—Bo-In Lin (57) ABSTRACT

This invention includes an Acousto-optical tuning device by employing the TeO2 in share mode, non-collinear and in high RF frequency (or large Bragg's deflection region), it is able to achieve the telecomm worthy tunable filter that provides high tuning speed, no-moving parts, very narrow filter line-width (0.2 nm for instance) and with miniature size practical for a optical telecom active module. This tuning characteristic is achieved by taking the particular advantages that the angle of incidence (AOI) and angle of diffraction (AOD) are divergent in a frequency range just suitable for a shorter wavelength application required by modern telecommunication systems while the acoustic wave decay in this frequency range can be properly managed to achieve the design goals. Furthermore, by generating a diffracted beam with larger AOD, implementation of filtering for optical propagations of different wavelengths can be conveniently selected. Other than the TeO2 crystals, the AOTF can also be formed with AsS3 and GeAsSe crystals based on the same acoustic-optical interaction processes at a higher RF frequency range as discussed in the above descriptions.

40 Claims, 5 Drawing Sheets

MINIATURE, NARROW BAND, NON-COLLINEAR ACOUSTIC OPTICAL TUNABLE FILTER FOR TELECOM APPLICATIONS

FIELD OF THE INVENTION

The present invention relates generally to apparatuses and method for providing tunable filter for optical fiber signal communication systems. More particularly, this invention relates to new configurations and methods for implementing a far off-axis, large Bragg's deflection angle, non-collinear Acousto-optical tunable filter having a miniaturized size and very narrow bandwidth suitable for DWDM applications with 25 Ghz, 50 Ghz and 100 Ghz channel spacing adapting no moving parts or thermal tuning to achieve high speed reliable tuning.

BACKGROUND OF THE INVENTION

Contemporary means of tunable filters for the optical telecommunications market use mechanical actuators such as piezzo electric devices, MEMS, step motors along with high-density gratings to achieve narrow bandwidth wavelength selection and tuning. Still others use thermal means on a grating device, which is either by direct heating/cooling or by indirect (such as current) of heating/cooling, to change the spacing of a thermally sensitive grating to achieve wavelength tuning. These methods, although feasible and commercially available, are very slow in tuning speed, e.g., tuning speed in the neighborhood of hundreds of milliseconds or seconds. Stability often becomes a problem too caused either by the slow response of sensing the temperature for thermally tuning the devices or caused by the high susceptibility to vibration and shock when a moving part is implemented for tuning the devices.

In contrast, tuning technologies implemented with Acousto-optical tunable filter (AOTF) using the birefringent crystals would have a higher likelihood to resolve the above-mentioned difficulties. However, tuning with conventional AOTF techniques is also faced with limitations of size and bandwidth. A typical AOTF with collinear configuration with TeO2 in share mode as that disclosed by Chang, et al as will be discussed below can achieve nanometer filter bandwidth but with very big sizes, e.g., a 2 nm bandwidth collinear AOTF would require a crystal 30 mm length. Similar constraints exist for non-collinear configuration with TeO2 in share mode and with low RF frequency applications also disclosed by Chang, et al.

Figure 1A:
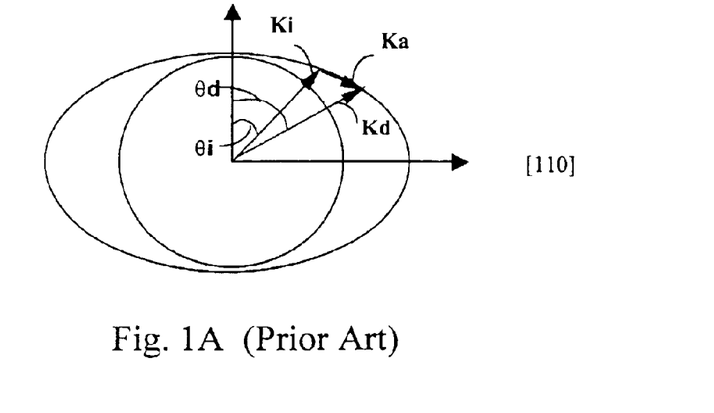
FIGS. 1A to 1B are wave-vector diagram illustrated as an Optical Refractive Index Ellipsoid for showing the Acousto-optic interaction in a birefringent TeO2 crystal as a conventional tuning device.

Typical AOTF applying birefringent crystals are produced with specific configurations, namely, when a crystal is cut, the PZT electrodes platting surface is cut, instead of perpendicular to, but a mall angle (Qa) from the crystals [110] axis. All crystals have three principle axis [100], [010] & [001] as designated in [x y z] axes for optical interactions. For homogeneous crystals, all optical properties are the same along all three axes. For inhomogeneous crystals, optical properties along different principle axis may behave differently as that of birefringent crystals. However, acoustic waves may not necessarily travel along the optical axis. There are two types of acoustic traveling waves: Longitudinal and Share. The Longitudinal wave is a compression wave and the Share wave is simply to the light wave oscillating up/down while traveling horizontally for example. For "on-axis" share wave TeO2, it travels along [110], in Z plane and along the diagonal of X and Y-axes. For "Off-axis" share wave, it typically refers to what FIG. 1A depicts, a small angle off [110] and Z plane. For angles larger then 10 degrees, it is often referred to as "far off axis designs". The off axis combination as shown may eliminate the need for tilted crystals. It may improve optical degeneracy, which happens often with symmetrical designs as that of the configuration shown in FIG. 1A as will be further discussed below wherein the crystal can be used with either surfaces functioning as the "front" surface.

When tuning with a radio frequency (RF) signal with a high frequency, the acoustic wave inside the crystal decays rapidly making the birefringent crystals, e.g., TeO2, almost unusable for RF signal with frequency higher than 200 MHz. For that reason, almost all non-collinear share-mode TeO2 designs are implemented with low RF frequency lower than 100 MHz. With an optical wavelength of 1.55 $\mu$m, the RF frequency is in a range of 20–50 MHz and the filter bandwidth is very wide. In terms of grating effect, its grating line density is too low to be, useful for use on tunable filters in a telecommunication system, in particular for a divisional wavelength demultiplexing (DWDM) system, with which the passband requirement is less than 0.2 nm. One way to narrow the filter bandwidth is to increase the crystal length along optical path direction, which results in a very long crystal. Typically for 2 nm wide Acousto-optical tunable filter (AOTF), the crystal length is more then 30 mm long. For modern telecommunication systems that required miniaturized devices, conventional technologies of applying acoustic-optical tuning techniques are not able to provide effective solutions for making a useful AOTF suitable for tunable laser implementations.

Figure 1B:
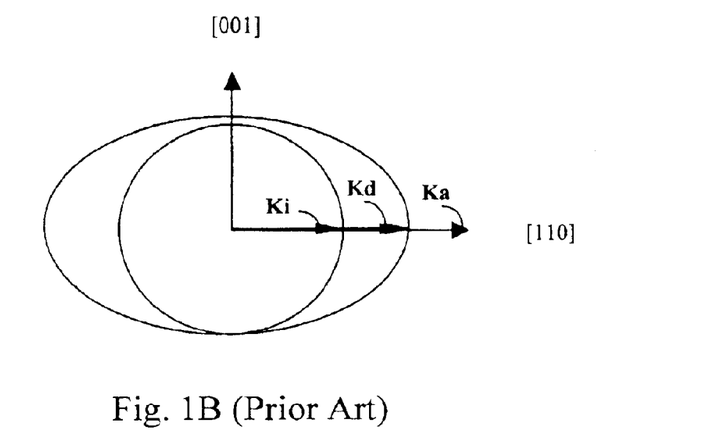
Figure 1C:
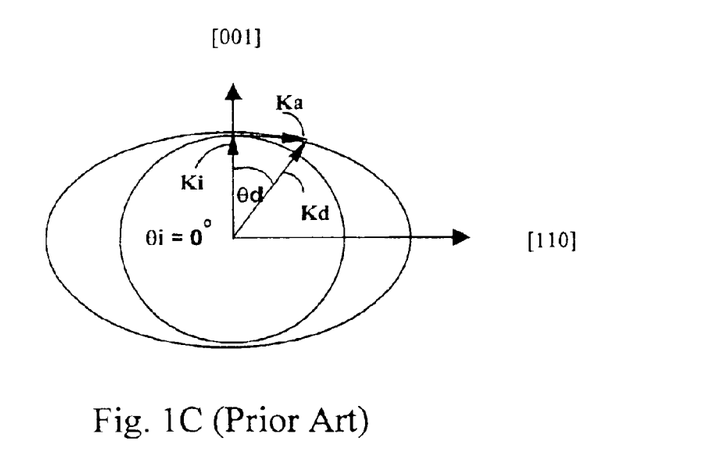
FIG. 1C is a wave-vector diagram illustrated as an Optical Refractive Index Ellipsoid for showing the Acousto-optic interaction in a birefringent TeO2 crystal as a conventional deflection scanning device.

Chang disclosed in several United States patents, e.g., U.S. Pat. Nos. 5,329,397, 4,720,177, 4,582,397, 4,343,503, and 4,052,121, techniques of using collinear and non-collinear electrically tunable Acousto-optical filters. These filters are implemented with interactions between the acoustic and optical waves in the acoustically an-isotropic and optically birefringent crystals. FIGS. 1A and 1B are diagrams for showing the Optical Refractive Index Ellipsoid in a birefringent TeO2 crystal cut along particular axis and as a result shown in the figures that the X axis is along the diagonal of two other principle axes, the Y axis is shown as the principle axis. The symbol K designates wave vectors, e.g., the direction of incident light is projected along a direction shown by Ki and the direction of projection of the diffracted wave is shown in a direction of Kd and the direction of the acoustic wave is along a direction shown as Ka. For a share wave, the direction along [110] is the propagation direction. Therefore, in FIG. 1, the acoustic wave direction Ka is slightly non-parallel to [110] indicating the "off-axis" applications. The length of Ka measures the RF frequency (fa). In FIG. 1A, according to the prior art AO non-collinear filter of Chang, with TeO2 in Share-mode, in which all three waves are traveling along different directions satisfying Bragg's law of diffraction with Ki and Kd are on the same side of the quadrant thus resulting a low value of Ka, i.e., low RF frequency. At high frequency, the acoustic wave inside the crystal decays rapidly, especially in the rang of visible wavelength, the AO filter is almost unusable for an RF frequency fa greater than 200 Mhz. For this reason, almost all non-collinear Share-mode TeO2 Acousto-optical filters are with implemented with low RF frequency <100 Mhz. With 1.55 um optical wavelength, the RF frequency fa is in the range of 20–50 Mhz and the filter bandwidth becomes very wide. Hence, the grating line density is too low for application as tunable filters in a telecommunication system with a passband less than 0.2 nm. In order to narrow down the filter bandwidth, the length of the crystal has to increase along the direction of the optical path thus preventing further miniaturization of the AO filters implemented with such a technologies. FIG. 1B shows a similar configuration with collinear design with TeO2 in Share-mode, in which all three waves are traveling along the same direction also satisfying Bragg's law of diffraction. Again, for an optical wavelength of 1.55 um, the RF frequency (fa) is about 23 Mhz and the collinear filters encounter similar technical limitations as that discussed above for a non-collinear AO filters. Since the fiber optical signal transmissions are now more commonly implemented in the telecommunication and network systems, and as the tunable lasers using the Acousto-optical tunable filters are key and important devices for such systems, there is an ever-urgent demand to resolve these limitations and difficulties. FIG. 1C illustrates a typical implementation on a birefringent crystal for an Acousto-optical deflectors. The incident wave propagates perpendicular to or almost perpendicular with a small incidence angle relative to the acoustic wave. The deflected light that is diffracted to a different propagating direction can be adjusted to propagate along different tunable angles by changing the frequency of the acoustic wave thus creating a scanning effect. This Acousto-optical configuration is often used as scanner or deflector. As will be further discussed below in FIGS. 4A and 4B, the frequency range as shown in FIG. 1C represents a zone where the angle of incidence and angle of deflection angle near zero relative to the [001] axis.

More specifically, in fiber telecommunications, tunable components including tunable lasers, tunable filter, tunable attenuators, etc. are essential to provide system reconfiguration and reprogramming and the key parameters in optical networks are the speed, range, stability, and flexibility of wavelength tuning. Particularly, as digital video, audio and wide varieties of digital data and signals are transmitted via broadband networks, the lack of flexibility in network management becomes an ever-increasing headache for network managers among carriers. As optical network deployment approaches saturation and becomes ever so complicated and expensive, re-deployment and re-configuration become necessary. Therefore, flexible/tunable optical components become essential for next generation optical telecomm equipment. Different network systems implemented with tunable components are being developed currently or in the near future at major equipment makers. Furthermore, tunable filters, besides its use in a tunable laser deployed network, it finds its use also in the OADM and similar configurable switching networks.

For these reasons, the Acousto-optical tunable filters even can be tuned with high tuning speed without moving parts and thus are more reliable, are still of limited usefulness for application to the optical fiber communications networks. Therefore, a need still exists in the art of optical fiber system and component manufacturing and design, particularly those related to AOTF for tunable laser applications, to provide new and improved system and component configurations and designs to overcome the above-mentioned technical difficulties and limitations.

SUMMARY OF THE PRESENT INVENTION

It is therefore an object of the present invention to provide a new and improved Acousto-optical tunable filter (AOTF) suitable for application as a tunable filter for the optical telecommunication industry that is economical, reliable, robust and with superior optical performances such that the above mentioned limitations and difficulties can be resolved. Specifically, it is an object of this invention to provide a tunable filter implemented with an Acousto-optical tunable filter that can be tuned with an RF signal of high frequency such that the AO filter can be provided with miniaturized size. With the implementation of the AOTF, the tunable filter is provided with no moving parts for the fiber networks that offers broadband tunability, high output power, narrow filtering line-width and highly reliable. Furthermore, the method of tuning as disclosed in this invention is non-thermal and non-mechanical such that the tuning speed is in the sub-microsecond range.

Furthermore, it is the object of this invention to provide an AOTF with miniaturized size that has high channel density and high tuning speed with a configuration that is convenient to manufacture and can be produced economically at a relatively low cost. Specifically, the manufacturing process can be performed with highly automated processes as that applied in the electronic industries for manufacturing the integrated circuits and electronic package and assembly processes. The tunable filters now implemented with the improved and miniaturized AOTF of this invention can be produced with competitive price and can be practically implemented in wide ranges of optical fiber networks for telecommunication applications.

Briefly, in a preferred embodiment, the present invention discloses an Acousto-optical tunable filter (AOTF) implemented in a birefringent crystal tunable by an RF signal having a frequency substantially greater than 100 MHz with a filter bandwidth in a sub-nanometer range. In a preferred embodiment, the AOTF includes a birefringent crystal provided for a far off-axis optical transmission with which its frequency is tunable (selectable) by applying an acoustic wave projected substantially and close to perpendicular to the optical transmission. In another preferred embodiment, the AOTF wherein the on-axis optical transmission is with an angle of incidence along a [001] lattice axis in the birefringent crystal and the tuning acoustic wave is projected substantially along a [110] lattice axis.

The AOTF of this invention is suitable for implementation as a passband filter of about 0.2 nm external cavity tunable laser. This external cavity tunable laser includes an external cavity tunable laser that includes a frequency-tuning device configured as an Acousto-optical cell including a first and a second Acousto-optical diffraction means having a narrow-band optical filtering Bragg grating. In a preferred embodiment, the first Acousto-optical diffraction means includes a first Acousto-optical crystal and the second Acousto-optical diffraction means includes a second Acousto-optical crystal. The external cavity tunable laser of further includes a reflection mirror driven by a PZT assembly to reflect a beam projected from the Acousto-optical cell back to transmit therethrough again. The external cavity tunable laser further includes a first electrode connected to the first Acousto-optical diffraction means and a second electrode connected to the second Acousto-optical diffraction means. The first and second Acousto-optical diffraction means having diffraction phase gratings for intra-cavity narrow-band wavelength filtering and the first electrode is connected to an RF signal for tuning a central frequency of the narrow band Bragg grating the second electrode is connected to a second electric source to provide a second order filtering for compensating a wavelength shift.

In a preferred embodiment, this invention discloses a frequency-tuning device disposed in an Acousto-optical birefringent crystal. The frequency-tuning device includes a means for applying an acoustic frequency onto the frequency-tuning device in an acoustic frequency range to effect a divergent projection between an optical incident angle and a diffracted angle relative to an optical axis as the acoustic frequency is increased. In a preferred embodiment, the means for applying an acoustic frequency onto the frequency tuning device in the acoustic frequency range to diffract a far-off-axis incident optical signal relative to the optical axis to a diffracted optical signal along a corresponding divergent diffracted angle. In another preferred embodiment, the means for applying an acoustic frequency onto the frequency-tuning device further comprising an RF tuning device for applying an RF signal having a frequency around 300 MHz. In another preferred embodiment, the frequency-tuning device disposed in a TeO2 crystal. In another preferred embodiment, the optical incident signal projected substantially along a [001] crystal axis in a TeO2 crystal. In another preferred embodiment, the optical incident signal projected substantially along a [001] crystal axis in a TeO2 crystal and the diffracted signal projected along a negative diffracted angle relative to the [001] crystal axis in the TeO2 crystal. In anther preferred embodiment, the means for applying an acoustic frequency onto the frequency tuning device further comprising an RF tuning device for applying an RF signal suitable for constructing a sub-nanometer band-pass filter. As oppose to other means of tunable filters in optical telecomm applications, the present invention adapts no moving parts, it is non-thermal and achieves high speed with broad tuning range while providing long-term stable reliable operations under severe operational environments.

These and other objects and advantages of the present invention will no doubt become obvious to those of ordinary skill in the art after having read the following detailed description of the preferred embodiment, which is illustrated in the various drawing figures.

DETAILED DESCRIPTION OF THE INVENTION

Figure 2:
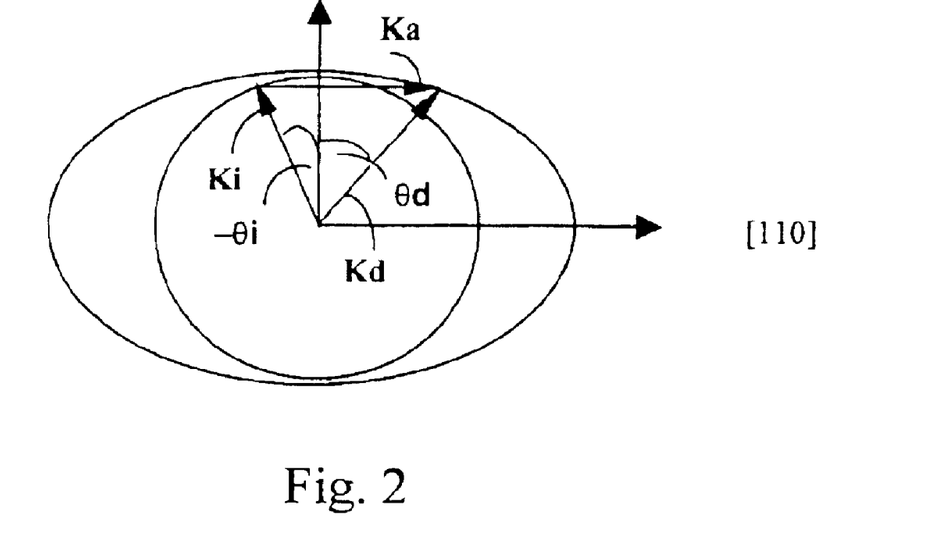
FIG. 2 is a wave-vector diagram illustrated as an Optical Refractive Index Ellipsoid for showing the Acousto-optical interaction in a birefringent TeO2 crystal of this invention.

Referring to FIG. 2 for an Acousto-optical tuning device of this invention. The Acousto-optical tuning device is implemented in a birefringent crystal such as TeO2 crystal where the acoustic wave Ka is projected along a [011] crystal axis as a share wave mode. The angle of incidence (AOI) is slightly negative relative to the [001] axis. Unlike the conventional Acousto-optical filter as discussed above, the Acousto-optical tuning device of this invention applies an acoustic signal in a frequency range as an radio-frequency (RF) signal with frequency substantially higher than 100 MHz. In FIG. 2, the frequency of the acoustic wave is illustrated as the length of the Ka vector, i.e., the longer the vector Ka the higher is the RF frequency. Because of the nature of high RF frequency, the tuning TeO2 filter has a much narrower filtering line-width and the ATOF can be miniaturized with small size to achieve a pass bandwidth less than one nanometer, i.e., $\Delta\lambda<1$ nm, with a crystal of about five millimeters.

Figure 3:
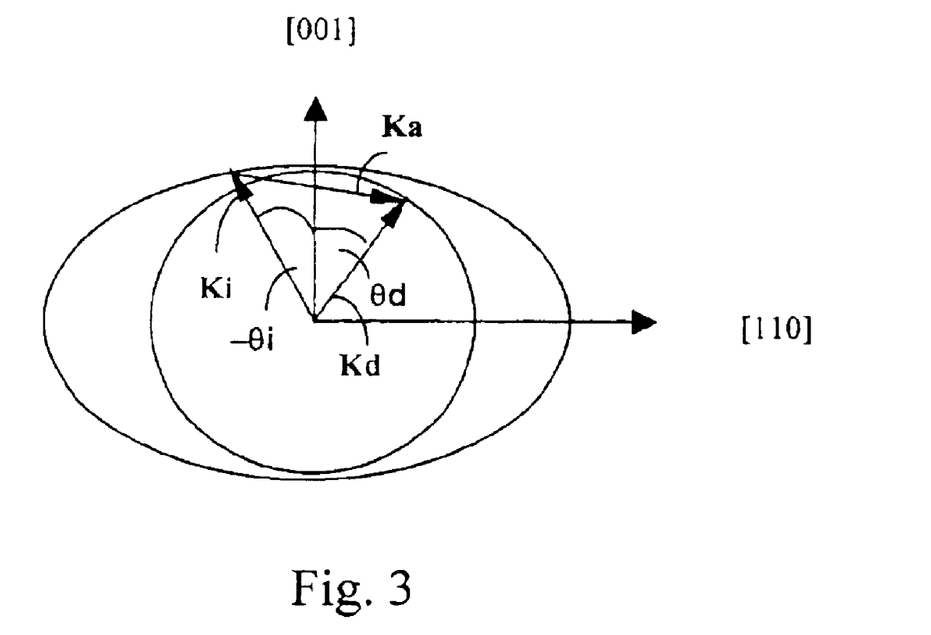
FIG. 3 is another wave-vector diagram illustrated as an Optical Refractive Index Ellipsoid for showing the Acousto-optical interaction in a birefringent TeO2 crystal of this invention.
Figure 4A:
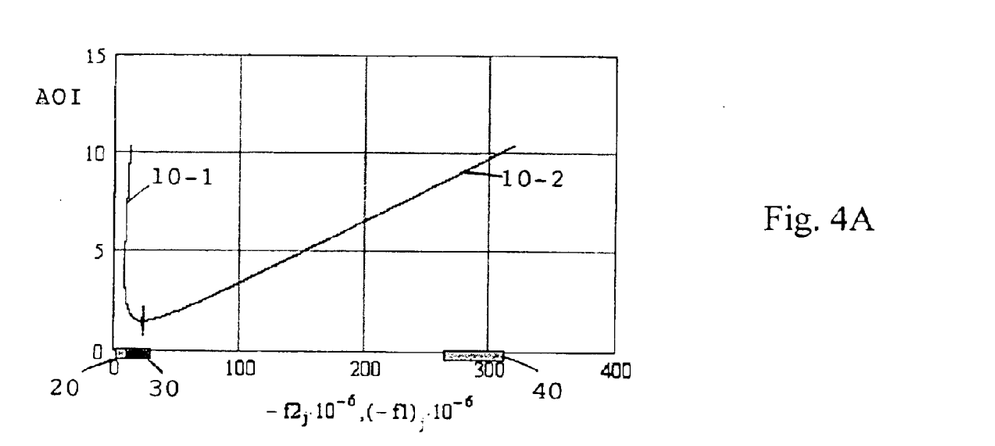
FIGS. 4A and 4B are diagrams for showing the angular variations of the angle of incident (AOI) and the angle of diffraction (AOD) respectively as function of frequency.
Figure 4B:
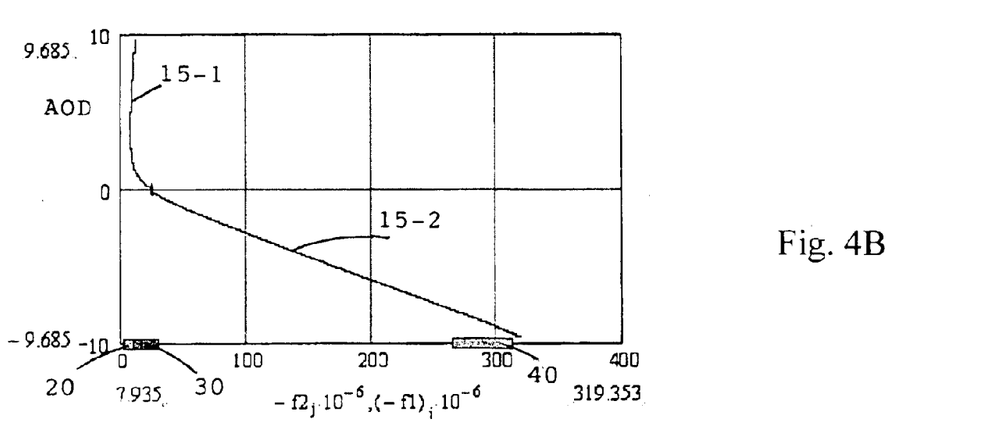

The inventiveness of this invention can be further appreciated by referring to FIGS. 4A and 4B for the variations of the angle of incidence (AOI) and angle of diffraction (AOD) resulted from Bragg's diffraction of TeO2 in a share-mode at 1.55 nm wavelength. The angular variations are shown over a range of the RF frequency shown as the horizontal axis ranging up to 400 MHz. Each of these curves in shown in FIGS. 4A and 4B are separated into two curve segments, i.e., segments 10-1 and 10-2 in FIG. 4A, and segments 15-1 and 15-2 in FIG. 4B, and these two segments intersect at a singular point around zero degree relative to the vertical axis, i.e., [001] axis. In addition to these curve segments, there are also special frequency ranges as that marked out along the horizontal axis. The first range 20 marked out in FIGS. 4A and 4B represents a frequency range implemented by a Acousto-optical tuning device shown in FIGS. 1A and 1B where the AOI and AOD are both positive and having relative large angles as illustrated by the left portion of the segments 10-1 and 15-1. The far left portion of segments 10-1 and 15-1 represent the operational regime of FIG. 1B when the optical and acoustic waves are co-linear that they are propagated along the same direction. As the frequency increased and fall into the frequency range of 30, the AOI and AOD are both decreased to smaller positive angles and illustrated as an Acousto-optical tuning device implemented according to FIG. 1C. Conventional Acousto-optical tuning as discussed above generally stay within the frequency ranges near the ranges 20 or 30 due to a concern that the acoustic wave tends to decay rapidly in higher frequencies. Unlike the conventional technique, the Acousto-optical tuning device implemented in the present invention in a birefringent crystal such as TeO2 is operated in a frequency range 40 where the AOI and AOD are divergent thus the tuning device can be tuned with higher frequency to achieve narrower pass bandwidth. As shown in FIGS. 4A and 4B, the AOI and AOD around the frequency range 40 is approximately ten degrees where the acoustic wave decay is tolerable and the tuning device is feasible to achieve a bandwidth suitable for application in modern telecommunication applications to a wavelength about 1.55 μm. The crystal length of such a tuning device can be reduced to a reasonable size around five millimeters. FIG. 3 is another wave vector diagram for showing another preferred embodiment where the acoustic wave Ka is off-axis from [110] to prevent a possible optical degeneracy.

Thus the main invention as implemented in this new and improved Acousto-optical tuning device is by employing the TeO2 in share mode, non-collinear and in high RF frequency (or large Bragg's deflection region), it is able to achieve the telecomm worthy tunable filter that provides high tuning speed, no-moving parts, very narrow filter line-width (0.2 nm for instance) and with miniature size practical for a optical telecom active module. This tuning characteristic is achieved by taking the particular advantages that the angle of incidence (AOI) and angle of diffraction (AOD) are divergent in a frequency range just suitable for a shorter wavelength application required by modern telecommunication systems while the acoustic wave decay in this frequency range can be properly managed to achieve the design goals. Furthermore, by generating a diffracted beam with larger AOD, implementation of filtering for optical propagations of different wavelengths can be conveniently selected. Other than the TeO2 crystals, the AOTF can also be formed with AsS3 and GeAsSe crystals based on the same acoustic-optical interaction processes at a higher RF frequency range as discussed in the above descriptions.

Figure 5:
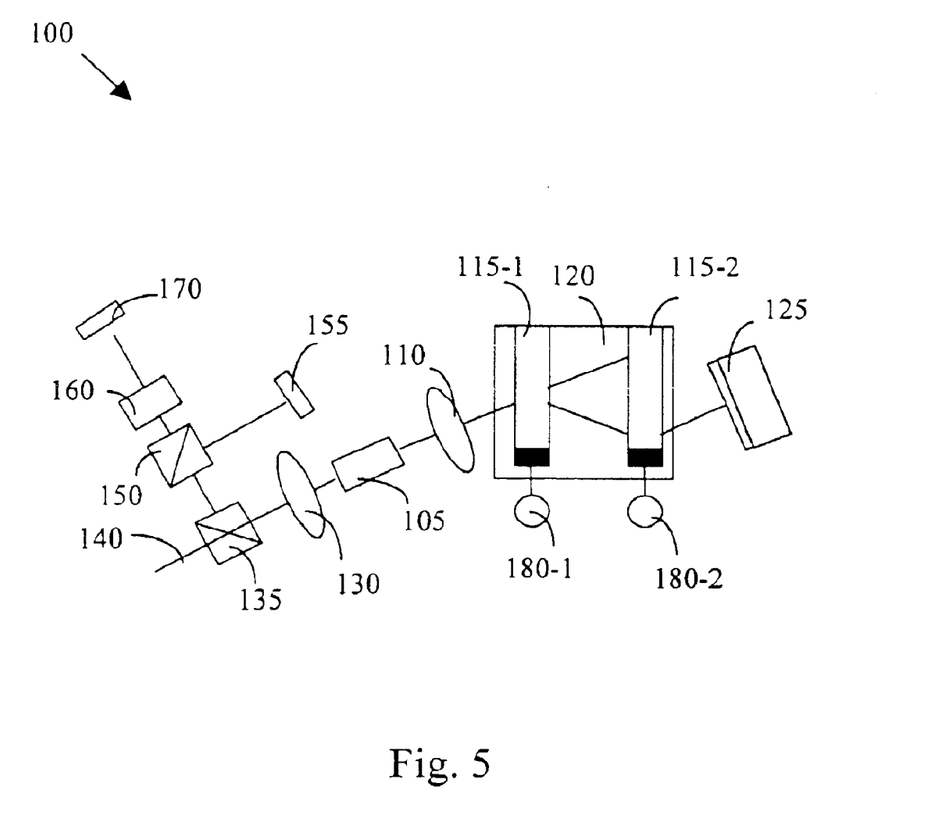
FIG. 5 is a schematic functional block diagram for showing an external-cavity laser (ECL) based acousto-optically tuned laser of this invention.

FIG. 5 shows a functional block diagram for a tunable laser 100 based on External Cavity Laser (ECL) technology where the new and improved Acousto-optical tuning filter as discussed above is employed. The tunable laser is acousto-optically tuned with wide tuning range. The laser can be continuously tuned or discretely tuned at 25 Ghz and 50 Ghz spacing on the standard ITU grid when integrated with a wavelength locker. The tunable laser as it is configured now can cover easily 100 channels (40 nm) and is provided to move down to 12.5 Ghz spacing in the future. The tunable laser includes a laser diode chip 105 to function as a light source. The laser diode chip 105 is a Fabri-Perot chip laser with broadband, IR emission spectrum. It is the gain cell of ECL laser resonator that is commonly applied in ECL configuration for emitting laser beam to pass through a first collimating lens 110 to project the laser beam onto a main frequency-tuning device 120. The frequency-tuning device 120 is configured as an acousto-optical cell that includes two crystals 115-1 and 115-2 each is configured and tuned applying RF in frequency ranges suitable for narrower pass bandwidth filtering as discussed above. The acousto-optical crystals have a narrow-band optical filtering Bragg grating. After passing through the acousto-optical cell 120, the laser beam is projected to a high reflection mirror 125 driven by a PZT assembly to reflect the beam back to the acousto-optical frequency-tuning cell 120 again to project through the first collimating lens 110 and a second collimating lens 130. The collimated beam is then projected to a first beam splitter 135 that separate a major portion of the beam to an output fiber 140 and a remaining portion of the beam is projected to a second beam splitter 150. From the second beam splitter 150, a first portion of the beam is projected to a first photo-detector 155 and a remaining portion of the beam is projected to a wavelength monitoring locker, e.g., an etalon 160, then monitored by another photo-detector 170. The tunable laser 100 of this invention is configured as an ECL-based tunable laser that has the advantages of high output power, narrow laser oscillation line-width, superior mode quality and high Side Mode Suppression Ratio (SMSR), low RIN noise, and low manufacturing costs.

Figure 6A:
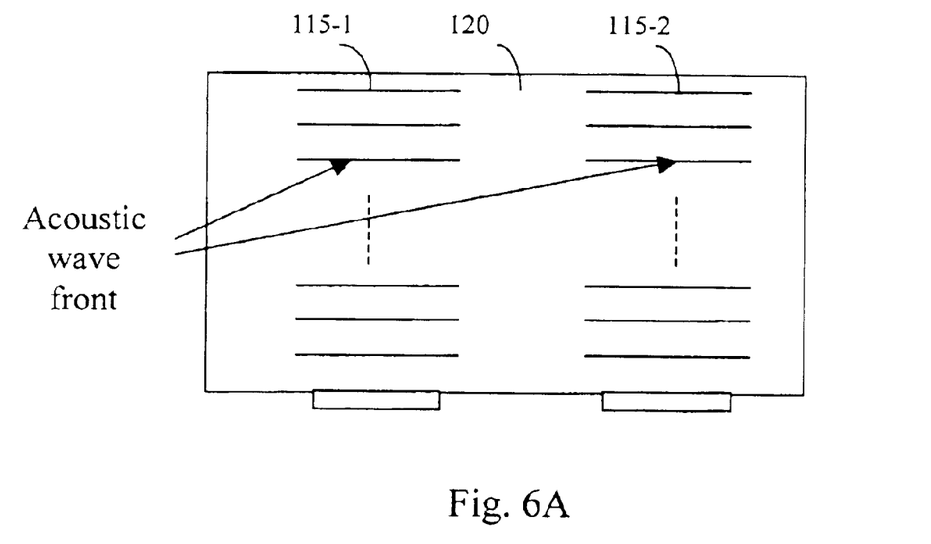
FIGS. 6A and 6B are single Acousto-optical crystal formed with two grating columns along the [110] direction and with an angular alignment with respect to the [110] direction for acoustic propagation.
Figure 6B:
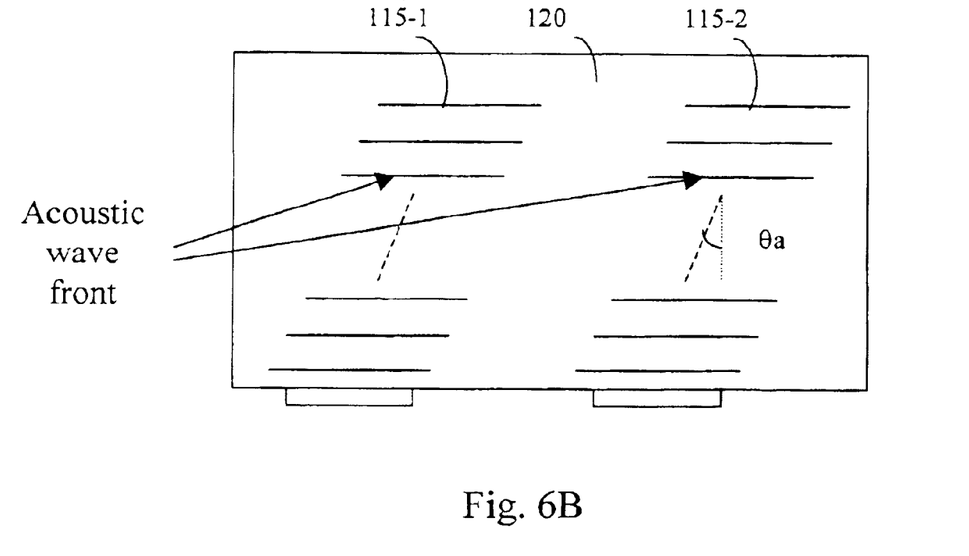

Two electrodes 180-1 and 180-2 are connected to the acousto-optical crystals 115-1 and 115-2 to control the frequency-tuning function of these two AO crystals. The Acousto-optical crystals are provided with diffraction phase gratings for intra-cavity narrow-band wavelength filtering (namely AOTF: Acousto-optical-tunable-filter) by applying RF frequency substantially higher than 100 MHz. Specifically, both crystal cells are aligned to the Bragg's angles for high diffraction efficiency in the first order diffraction. As described above, the AOTF of this invention is implemented with a non-collinear AO design in which the acoustic wave propagates almost perpendicular to the lightwave, therefore, this AOTF is enabled to take advantage of the high frequency diffraction effect to achieve narrow filtering bandwidth while using a very small crystal size (<5 mm in length). Furthermore, by using a second crystal as disclosed or a second column as shown in FIGS. 6A and 6B, the frequency shift is corrected with the second crystal or crystal column functioning as a second AOTF. The gratings can also be implemented as Surface Acoustic Wave (SAW) grating and the tunable laser can be implemented as a SAW-based tunable laser. The SAW grating is similar to that of the embodiments as shown above instead the surface acoustic wave (SAW) grating is reflective. The center optical frequency of the acousto-optical gratings is tuned electrically by means of RF signals. The second crystal acts as a second order filter and a wavelength shift compensator. Therefore, the double pass through the second order optical narrow-band filter will result in superb optical oscillation line-width. As oppose to other designs of AOTFs that are large and inefficient in terms of power consumption, the AOTF design implemented in the tunable laser as described above is much smaller in size and consumes as little as <200 mw of RF power. Thus, this enables the integration of the AOTF into a telecomm standard 18 pin-butterfly package (1"×¼"×½") for industrial use. As described above, the tuning range can be as high as 120 nm covering 300 channels of the 50 Ghz spacing ITU grid. With high-speed electronics, the tuning speed is in the order of microseconds. The improvements of the tuning speed described above are achieved because, unlike the conventional technologies, the turning speed of the AOTF is no longer the limiting factor. Compared to the conventional systems tuned by MEMS or thermal tuning elements the AOTF of is invention can provide higher tuning speed. Therefore, the tuning speed of the tuning electronics such as the locking speed of the phase lock loop (PLL) of an RF source now becomes the limiting factor of the tuning speed, and for this reason, the tuning speed is significantly improved.

The Acousto-optical (AO) crystals 115-1 and 115-2 are acting as volume gratings. When driven by an RF signal, the crystal lattice oscillates in accordance with the frequency of the RF signal resulting periodical variation of optical refractive index of the crystal. The physical length of a period (pitch) defines the grating's diffraction resolution as that of the fixed pitch grating, and is related to the frequency of the RF signal and the acoustic wave traveling speed inside of the crystal, the faster the speed, the longer the grating pitch. On the other hand, the oscillation strength defines the diffraction efficiency and that relates directly to the product of driven signal strength (RF power) and the AO crystal's Figure of Merit. The higher the Figure of Merit, the lower the driven RF power needed for the same level of AO grating diffraction efficiency. In addition to the general properties of regular volume gratings, the AO crystal gratings do provide means for very high efficiency of first-order diffraction. It is because of the nature that, the wave vectors of the traveling acoustic wave, incident optical wave and the diffracted optical wave must satisfy the phase matching condition according to the Braggs law of diffraction. Therefore, with proper design of the crystals, this invention makes use of the highly efficient property of the first-order diffraction as a narrow band optical filter.

Because of a traveling wave nature of the AO diffraction grating, the diffracted light is frequency shifted by the amount of the acoustic frequency. The direction of the shift is dependent upon the relative direction of the acoustic wave and the incident light wave and can be understood by the analogy of Doppler Shift. Therefore, in a resonant laser cavity with one crystal and a reflective mirror after it, the reflected light after the forward pass and reverse pass of first order diffraction, as they are being "color" filtered, result in double shift of the light frequency away from the incident light. And this will not result in a highly efficient maintainable laser oscillation. In order to overcome this problem, this invention uses two of such crystals. For practical applications, in order to reduce the production costs, the two crystals are manufactured as one crystal with two cells as one preferred embodiment implemented in one of the products based on the configuration disclosed in this invention. When the first order diffraction from the first crystal enters into the second crystal it is frequency-shifted. Again the shift is a first order diffraction shift but with an opposite frequency shift after the second crystal. This double diffracted light incident onto a reflective mirror results in a zero net frequency shift. The reflected light when transmitted through the two cells the same manner and enters back into the laser gain cell with zero frequency-shift and being filtered four times.

To a specific crystal, the Figure of Merit defines its responsiveness to a driven RF signal. For meaningful Acousto-optical interactions, high Figure of Merit crystals are of interests, these include crystals composed of Lithium Niobate ($LiNbO_3$), Tellurium Dioxide ($TeO_2$), etc. And with RF excitation, two acoustic oscillation modes exist that derives different applications. These modes are longitudinal mode and share mode (transverse mode), and are dependent on the cut orientation relative to crystal principle axes. For Tellurium Dioxide, which is one of the preferred embodiments of this invention, the longitudinal mode is relative easy to excite and with fast acoustic speed. It has low acoustic attenuation but relatively low Figure of Merit, and therefore, requires relatively high RF power. In share mode, its velocity is very slow which results in very high, e.g., easily by 2 orders of magnitudes, Figure of Merit. Therefore, a share mode $TeO_2$ is used as the crystals for configuring the Acousto-optical filter. Other than these materials discussed above, for the purpose of implementing this invention, any birefringent crystals that have high Acousto-optical Figure of Merit may be employed to form the AOTF.

For the purpose of overcoming the difficulties of mode hopping, two moving mechanisms are provided. One is tuned with RF frequency to tune the AO crystals 115-1 and 115-2 and the other with a piezo-electric actuator for driving the reflection mirror 125. In the meantime, for the consideration of tuning speed, the moving range of the piezo-electric actuator needs only to cover the ¼ of free-spectrum range of the cavity mode, which is about 0.4 um. Therefore, with the design, as disclosed in this invention, the tunable laser as now configured can be a high speed tunable laser that is virtually mode hope free.

At each ITU grid (an optical frequency), the AOTF is set to the optical frequency by means of applied RF signals. However, the cavity length and its effective refractive index define the cavity resonant mode, e.g., optical frequency, natural resonant mode. The cavity resonant mode is not necessarily aligned to the center frequency of the AOTF. The filtered laser resonant mode is the result of the competition between the AOTF center frequency and the natural resonant modes of the laser cavity. And when the center frequency of AOTF moves to near the middle of two nearby natural resonant modes during tuning, the resonant mode will become "unstable" as being one of the two competing results of the neighboring modes with the pass band center frequency of the AOTF. Mode hope occurs, which is described as the laser oscillation mode hopes from one mode to the adjacent. The end result is abrupt discontinuity of laser power and wavelength. With the use of PZT, the reflection mirror can be moved. Therefore, when the AOTF is tuned to an ITU grid, the PZT can be adjusted to move the natural resonant cavity mode to the center of the AOTF pass band thus eliminating the instabilities, and ensuring a mode hope free operation at the ITU grid.

According to FIGS. 2 to 4B, this invention discloses a frequency-tuning device disposed in an Acousto-optical birefringent crystal, e.g., crystals 115-1 and 115-2. The tuning device includes a means such as electrodes 118-1 and 118-2 for applying an acoustic frequency onto the frequency tuning device in an acoustic frequency range, e.g., frequency range 40 in FIGS. 4A and 4B, to effect a divergent projection between an optical angle of incident (AOI) and an angle of diffraction (AOD) relative to an optical axis as the acoustic frequency is increased such as that shown FIGS. 4A and 4B when the AOI increases, the AOD decreases around the frequency range 40. In a preferred embodiment, the means for applying an acoustic frequency onto the frequency tuning device further applying an acoustic frequency in the acoustic frequency range to diffract an incident optical signal with a far-off-axis angle of incident (AOI), e.g., AOI around 10 degrees, to diffracted optical signal with a corresponding divergent far-off-axis angle of diffraction (AOD), e.g., AOD around −10 degrees as that shown in FIGS. 4A and 4B. In another preferred embodiment, the means for applying an acoustic frequency onto the frequency tuning device further comprising an RF tuning device for applying an RF signal having a frequency substantially higher than 100 MHz. In another preferred embodiment, the frequency-tuning device disposed in a TeO2 crystal. In another preferred embodiment, the frequency-tuning device disposed in a AsS3 crystal. In another preferred embodiment, the frequency-tuning device disposed in a GeAsSe crystal. In another preferred embodiment, the optical incident signal projected substantially along a [001] crystal axis in a shared-mode TeO2 crystal. In another preferred embodiment, the optical incident signal projected substantially along a [001] crystal axis in a shared-mode TeO2 crystal and the diffracted signal projected along a negative diffracted angle relative to the [001] crystal axis in the shared-mode TeO2 crystal. In another preferred embodiment, the means for applying an acoustic frequency onto the frequency tuning device further comprising an RF tuning device for applying an RF signal suitable for constructing a sub-nanometer band-pass filter.

FIG. 6A is a side cross sectional view of the Acousto-optical cell 120 that combines two crystals 115-1 and 115-2 into one crystal with two columns. The electrodes are then connected to the bottom surface. The configuration has the advantages that the manufacturing processes are simplified because one optical assembly process is no longer required and additional effort of optical alignments are eliminated. FIG. 6B shows an alternate embodiment of the acousto-optical cell 120 similar to FIG. 6A but the acoustic wave propagation angle is no longer zero degrees from the [110] direction as that shown above, but was designed and manufactured with a small angle (<10 degrees typically) off the main axis [110] as that discussed above. With the AOTF discussed above and by implementing a configuration that have dual path as shown in FIGS. 5 and 6, an AOTF of five millimeters can achieve a pass bandwidth of less than 0.4 nm or narrower. Alternatively, a ten millimeter crystal can achieve the same filtering capability thus can be conveniently applied in the modern telecommunication systems for high speed, reliable and accurate tuning.

According to FIG. 2 to FIG. 6B, this invention further discloses an external cavity tunable laser that includes a frequency-tuning device having a means for applying an acoustic frequency onto the frequency tuning device in an acoustic frequency range to effect a divergent projection between an optical angle of incident (AOI) and an angle of diffraction (AOD) relative to an optical axis as the acoustic frequency is increased, as that shown in FIGS. 4A and 4B, when the AOI increases, the AOD decreases with the increasing frequency around a frequency range 40. In a preferred embodiment, the frequency tuning device further configured as an Acousto-optical cell including a first and a second Acousto-optical diffraction means each having the means for applying the acoustic frequency in acoustic frequency range to effect a narrow-band optical filtering Bragg grating. In another preferred embodiment, the first Acousto-optical diffraction means comprising a first Acousto-optical crystal and the second Acousto-optical diffraction means comprising a second Acousto-optical crystal. In another preferred embodiment, the external cavity tunable laser further includes a reflection mirror driven by a PZT assembly to reflect a beam projected from the Acousto-optical cell back to transmit therethrough again. In another preferred embodiment, the external cavity tunable laser further includes a first electrode connected to the first Acousto-optical diffraction means and a second electrode connected to the second Acousto-optical diffraction means. In another preferred embodiment, the means for applying an acoustic frequency onto the frequency tuning device further comprising an RF tuning device for applying an RF signal having a frequency substantially higher than 100 MHz. In another preferred embodiment, the first and second Acousto-optical diffraction means are formed as a first column and a second column respectively in a single Acousto-optical crystal. In another preferred embodiment, the first and second Acousto-optical diffraction means are formed as a first column and a second column respectively in a Lithium Niobate (LiNbO$_3$) crystal. In another preferred embodiment, the first and second Acousto-optical diffraction means are formed as a first column and a second column respectively in a Tellurium Dioxide (TeO$_2$) crystal.

In essence, this invention discloses an optical system that includes a frequency tunable device disposed on an Acousto-optical birefringent crystal further having a means for applying an acoustic frequency onto the frequency tuning device in an acoustic frequency range to effect a divergent projection between an optical angle of incident (AOI) and an angle of diffraction (AOD) relative to an optical axis as the acoustic frequency is increased. In a preferred embodiment, the frequency-tuning device configured as an Acousto-optical cell and a reflection means for forward and backward transmitting an optical beam through the Acousto-optical cell for generating an optical beam with zero-wavelength shift and at least twice filtered by the Acousto-optical cell. In another preferred embodiment, the Acousto-optical cell further comprising an Acousto-optical tunable filter (AOTF) array having at least a first and a second Acousto-optical crystal. In another preferred embodiment, the Acousto-optical cell further comprising a first and a second Acousto-optical diffraction columns respectively disposed in an Acousto-optical crystal. In another preferred embodiment, the first and second Acousto-optical cells are formed as a first column and a second column respectively in a birefringent crystal having a predefined responsiveness to the first and a second Acousto-optical cells further comprising a surface acoustic wave (SAW) grating.

This invention further discloses a method for tuning a frequency in an optical system. The method includes a step of disposing a frequency-tuning device in an Acousto-optical birefringent crystal and applying an acoustic frequency onto the frequency tuning device in an acoustic frequency range to effect a divergent projection between an optical angle of incident (AOI) and an angle of diffraction (AOD) relative to an optical axis as the acoustic frequency is increased. In another embodiment, the method further includes a step of forming the frequency-tuning device as a frequency-tuning array comprising at least a first and a second Acousto-optical diffraction cells.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A frequency-tuning device disposed in an Acousto-optical birefringent crystal further comprising:
   a means for applying an acoustic frequency onto said frequency tuning device in an acoustic frequency range to effect a divergent projection between an optical angle of incident (AOI) and an angle of diffraction (AOD) relative to an optical axis as said acoustic frequency is increased.

2. The frequency-tuning device of claim 1 wherein:
   said means for applying an acoustic frequency onto said frequency tuning device further applying an acoustic frequency in said acoustic frequency range to diffract an incident optical signal with a far-off-axis angle of incident (AOI) to diffracted optical signal with a corresponding divergent far-off-axis angle of diffraction (AOD).

3. The frequency-tuning device of claim 1 wherein:
   said means for applying an acoustic frequency onto said frequency tuning device further comprising an RF tuning device for applying an RF signal having a frequency substantially higher than 100 MHz.

4. The frequency-tuning device of claim 1 wherein:
   said frequency-tuning device disposed in a TeO2 crystal.

5. The frequency-tuning device of claim 1 wherein:
   said frequency-tuning device disposed in a AsS3 crystal.

6. The frequency-tuning device of claim 1 wherein:
   said frequency-tuning device disposed in a GeAsSe crystal.

7. The frequency-tuning device of claim 1 wherein:
   said optical incident signal projected substantially along a [001] crystal axis in a shared-mode TeO2 crystal.

8. The frequency-tuning device of claim 1 wherein:
   said optical incident signal projected substantially along a [001] crystal axis in a shared-mode TeO2 crystal and said diffracted signal projected along a negative diffracted angle relative to said [001] crystal axis in said shared-mode TeO2 crystal.

9. The frequency-tuning device of claim 1 wherein:
   said means for applying an acoustic frequency onto said frequency tuning device further comprising an RF tuning device for applying an RF signal having a frequency substantially higher than 100 MHz; and
   said optical incident signal projected substantially along a [001] crystal axis in a shared-mode TeO2 crystal and said diffracted signal projected along a negative diffracted angle relative to said [001] crystal axis in said shared-mode TeO2 crystal.

10. The frequency-tuning device of claim 1 wherein:
    said means for applying an acoustic frequency onto said frequency tuning device further comprising an RF tuning device for applying an RF signal suitable for constructing a sub-nanometer band-pass filter.

11. An external cavity tunable laser comprising:
    a frequency-tuning device having a means for applying an acoustic frequency onto said frequency tuning device in an acoustic frequency range to effect a divergent projection between an optical angle of incident (AOI) and an angle of diffraction (AOD) relative to an optical axis as said acoustic frequency is increased.

12. The external cavity tunable laser of claim 11 wherein:
    said frequency tuning device further configured as an Acousto-optical cell including a first and a second Acousto-optical diffraction means each having said means for applying said acoustic frequency in acoustic frequency range to effect a narrow-band optical filtering Bragg grating.

13. The external cavity tunable laser of claim 12 wherein:
said first Acousto-optical diffraction means comprising a first Acousto-optical crystal and said second Acousto-optical diffraction means comprising a second Acousto-optical crystal.

14. The external cavity tunable laser of claim 12 further comprising:
a reflection mirror driven by a PZT assembly to reflect a beam projected from said Acousto-optical cell back to transmit therethrough again.

15. The external cavity tunable laser of claim 12 further comprising:
a first electrode connected to said first Acousto-optical diffraction means and a second electrode connected to said second Acousto-optical diffraction means.

16. The external cavity tunable laser of claim 11 wherein:
said means for applying an acoustic frequency onto said frequency tuning device further comprising an RF tuning device for applying an RF signal having a frequency substantially higher than 100 MHz.

17. The external cavity tunable laser of claim 11 wherein:
said frequency-tuning device disposed in a TeO2 crystal.

18. The external cavity tunable laser of claim 11 wherein:
said frequency-tuning device disposed in a AsS3 crystal.

19. The external cavity tunable laser of claim 11 wherein:
said frequency-tuning device disposed in a GeAsSe crystal.

20. The external cavity tunable laser of claim 11 wherein:
said optical incident signal projected substantially along a [001] crystal axis in a shared-mode TeO2 crystal.

21. The external cavity tunable laser of claim 11 wherein:
said optical incident signal projected substantially along a [001] crystal axis in a shared-mode TeO2 crystal and said diffracted signal projected along a negative diffracted angle relative to said [001] crystal axis in said shared-mode TeO2 crystal.

22. The external cavity tunable laser of claim 11 wherein:
said means for applying an acoustic frequency onto said frequency tuning device further comprising an RF tuning device for applying an RF signal having a frequency substantially higher than 100 MHz; and
said optical incident signal projected substantially along a [001] crystal axis in a shared-mode TeO2 crystal and said diffracted signal projected along a negative diffracted angle relative to said [001] crystal axis in said shared-mode TeO2 crystal.

23. The external cavity tunable laser of claim 11 wherein:
said means for applying an acoustic frequency onto said frequency tuning device further comprising an RF tuning device for applying an RF signal suitable for constructing a sub-nanometer band-pass filter.

24. The external cavity tunable laser of claim 12 wherein:
said first and second Acousto-optical diffraction means having diffraction phase gratings for intra-cavity narrow-band wavelength filtering.

25. The external cavity tunable laser of claim 15 wherein:
said first electrode is connected to an RF signal for tuning a central frequency of said narrow band Bragg grating.

26. The external cavity tunable laser of claim 15 wherein:
said second electrode is connected to a second electric source to provide a second order filtering for compensating a wavelength shift.

27. The external cavity tunable laser of claim 11 further comprising:
a collimated laser source for projecting a collimated optical signal of specific wavelength through said Acousto-optical cell.

28. The external cavity tunable laser of claim 12 wherein:
said first and second Acousto-optical diffraction means are formed as a first column and a second column respectively in a single Acousto-optical crystal.

29. The external cavity tunable laser of claim 12 wherein:
said first and second Acousto-optical diffraction means are formed as a first column and a second column respectively in a Lithium Niobate (LiNbO$_3$) crystal.

30. The external cavity tunable laser of claim 12 wherein:
said first and second Acousto-optical diffraction means are formed as a first column and a second column respectively in a Tellurium Dioxide (TeO$_2$) crystal.

31. The external cavity tunable laser of claim 12 wherein:
said first and second Acousto-optical diffraction means are formed as a first column and a second column respectively in a birefringent crystal having a predefined responsiveness to an radio-frequency (RF) driven signal.

32. The external cavity tunable laser of claim 12 wherein:
said first and a second Acousto-optical diffraction means having said narrow-band optical filtering Bragg grating further comprising a surface acoustic wave (SAW) grating.

33. An optical system comprising:
a frequency tunable device disposed on an Acousto-optical birefringent crystal further having a means for applying an acoustic frequency onto said frequency tuning device in an acoustic frequency range to effect a divergent projection between an optical angle of incident (AOI) and an angle of diffraction (AOD) relative to an optical axis as said acoustic frequency is increased.

34. The optical system of claim 33 wherein:
said frequency-tuning device configured as an Acousto-optical cell and a reflection means for forward and backward transmitting an optical beam through said Acousto-optical cell for generating an optical beam with zero-wavelength shift and at least twice filtered by said Acousto-optical cell.

35. The optical system of claim 34 wherein:
said Acousto-optical cell further comprising an Acousto-optical tunable filter (AOTF) array having at least a first and a second Acousto-optical crystal.

36. The optical system of claim 34 wherein:
said Acousto-optical cell further comprising a first and a second Acousto-optical diffraction columns respectively disposed in an Acousto-optical crystal.

37. The optical system of claim 34 wherein:
said first and second Acousto-optical cells are formed as a first column and a second column respectively in a birefringent crystal having a predefined responsiveness to an radio-frequency (RF) driven signal.

38. The optical system of claim 34 wherein:
said first and a second Acousto-optical cells further comprising a surface acoustic wave (SAW) grating.

39. A method for tuning a frequency in an optical system comprising:
disposing a frequency-tuning device in an Acousto-optical birefringent crystal and applying an acoustic frequency onto said frequency tuning device in an acoustic frequency range to effect a divergent projection between an optical angle of incident (AOI) and an angle of diffraction (AOD) relative to an optical axis as said acoustic frequency is increased.

40. The method of claim 39 comprising:
forming said frequency-tuning device as a frequency tuning array comprising at least a first and a second Acousto-optical diffraction cells.

* * * * *